Sept. 1, 1931.  A. K. HANKS  1,821,341
SLIDE SHIFTING DEVICE
Filed April 15, 1926   4 Sheets-Sheet 1
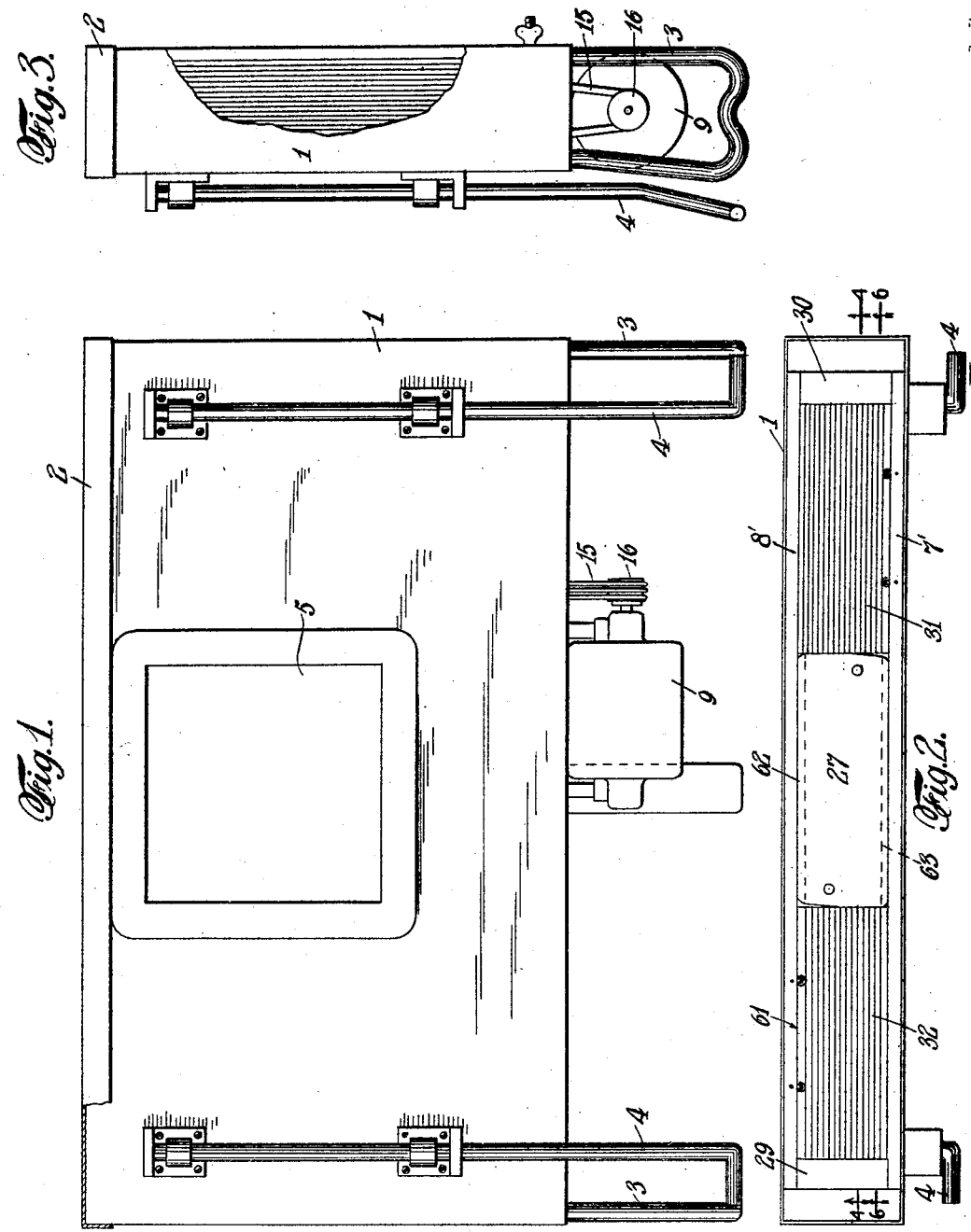

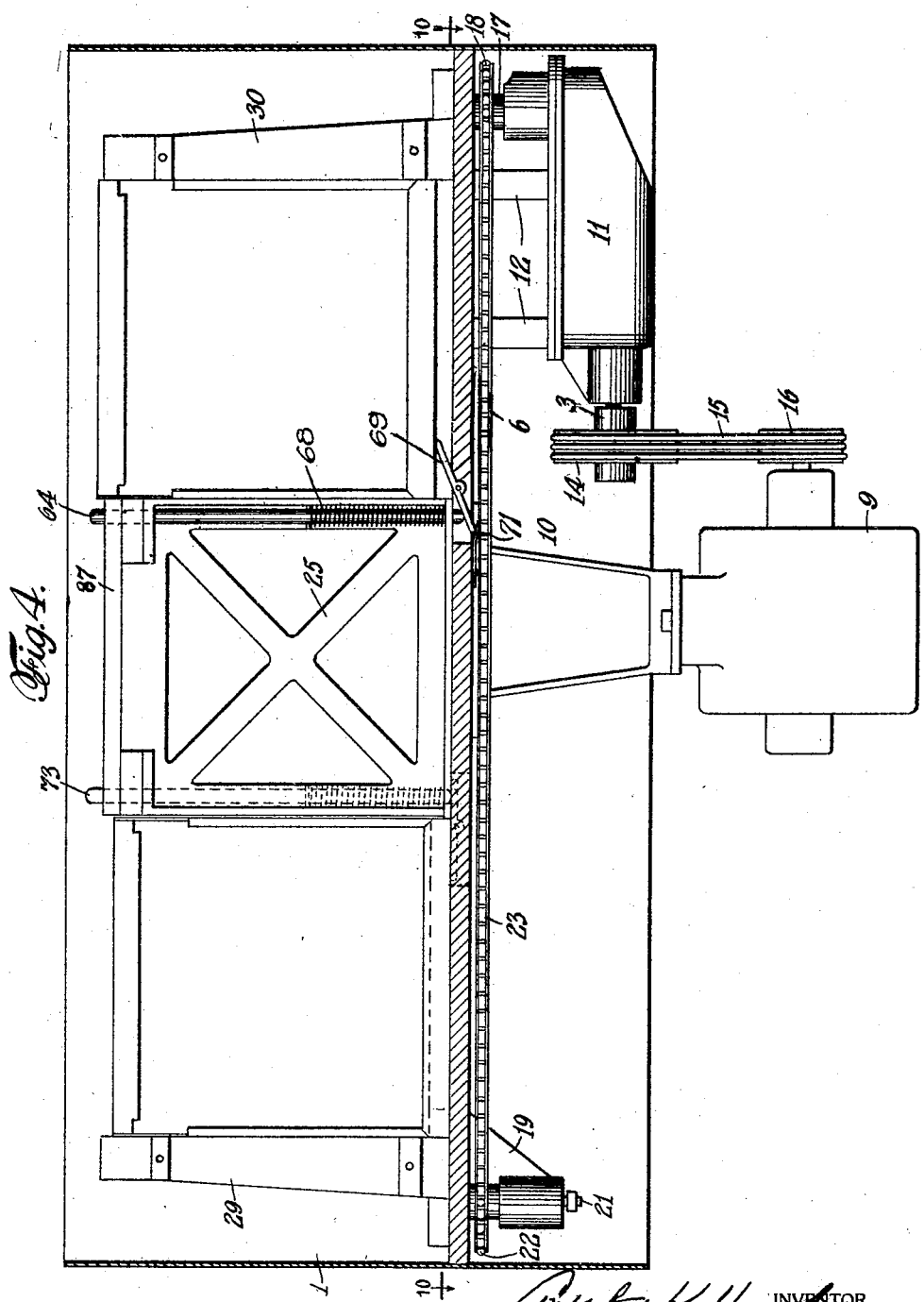

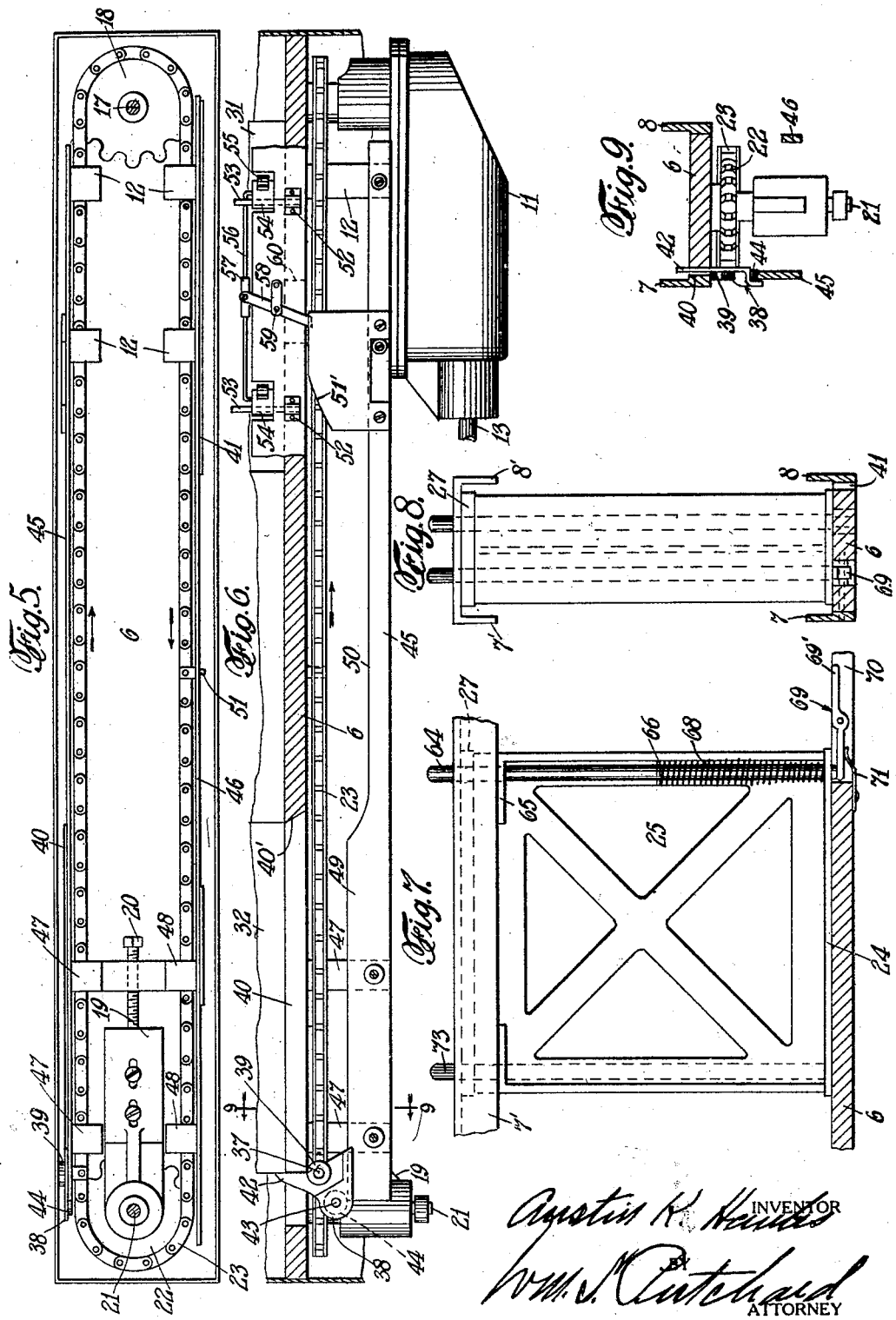

Sept. 1, 1931.   A. K. HANKS   1,821,341
SLIDE SHIFTING DEVICE
Filed April 15, 1926   4 Sheets-Sheet 4
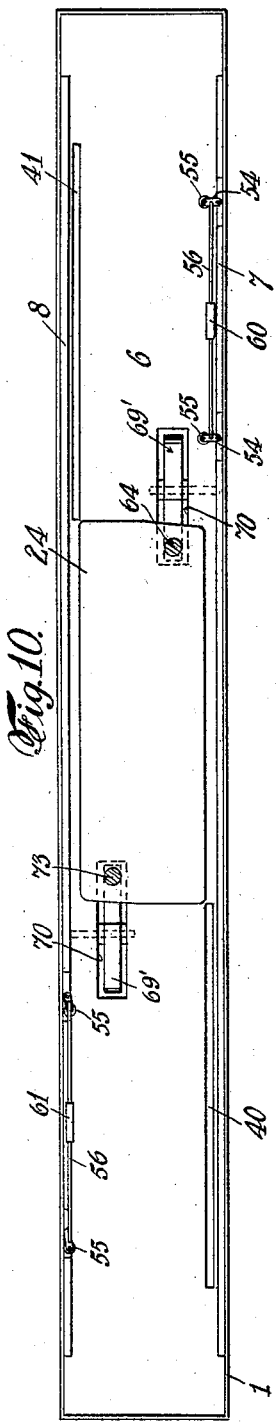
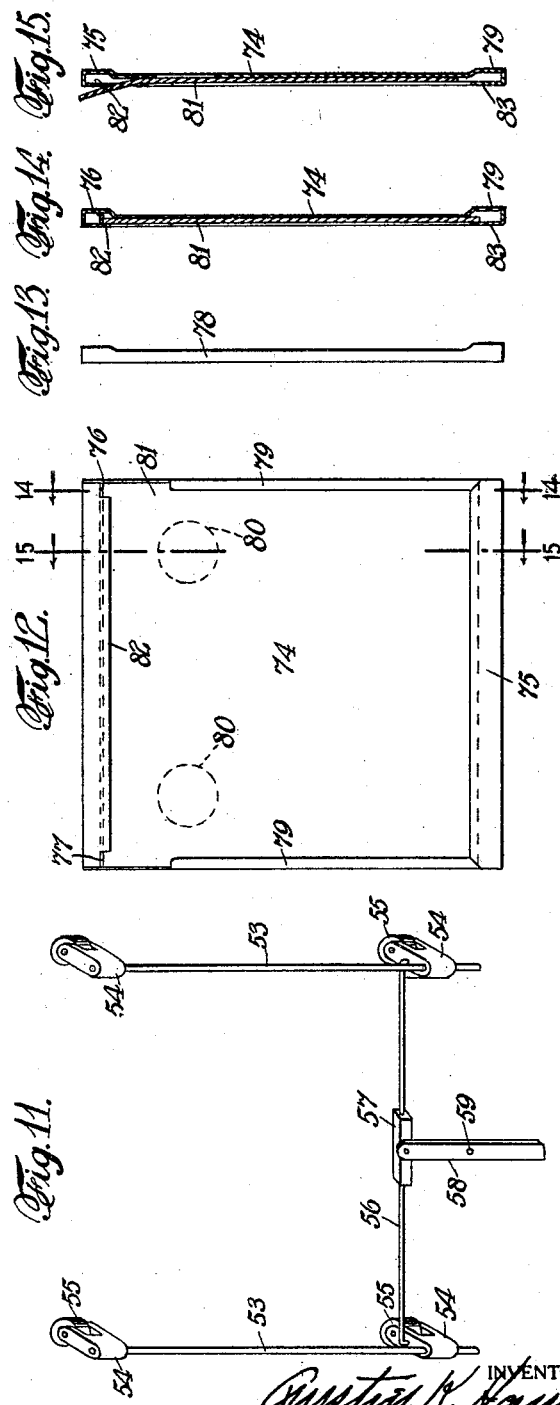

Patented Sept. 1, 1931

1,821,341

UNITED STATES PATENT OFFICE

AUSTIN K. HANKS, OF GREENSBORO, NORTH CAROLINIA, ASSIGNOR TO TRANS-LUX DAYLIGHT PICTURE SCREEN CORPORATION, OF NEW YORK, N. Y., A CORPORATION OF DELAWARE

SLIDE SHIFTING DEVICE

Application filed April 15, 1926. Serial No. 102,112.

My invention relates to the art of projection and more particularly to the art of opaque projection, that is to say, the art of projecting images on a screen by indirect light as distinguished from the art of projecting a transparent slide by direct projection.

By my invention I provide a means for automatically feeding a series of slides or views into and out of projecting position. In my device each slide of the series is moved into projecting position to be projected for a predetermined period of time upon a screen, after which time the picture is advanced and another slide moved into position to be projected. The operation is continuous, and the entire series of pictures may be successively and repeatedly exhibited as long as desired.

My device is adapted to be used with any opaque projector in which the slide is displayed at the rear of the projector in vertical position. It may also be adapted for use with other than opaque projectors, as will be obvious to those skilled in the art.

One of the objects of my invention is to provide a device which will fed the slides reliably without jamming and thereby causing the machine to stop.

Another object of my invention is to provide a machine that is rugged and one that can be worked continuously for hours, thereby making it adaptable for advertising display purposes.

Another object of my invention is to provide a means for easily removing the series of slides and substituting a new series without marring the slides and without any unnecessary delay.

Other objects and advantages of my invention will appear from the following description in which:

Figure 1 is a front elevation of my device.

Figure 2 is a plan view of my device with the cover removed showing the plates or slides in position.

Figure 3 is a side elevation of my device with a portion of the casing cut away, showing some of the plates or slides in position, this view being taken from the right of Figure 1.

Figure 4 is a section showing the interior of my device and taken along the line 4—4 of Figure 2.

Figure 5 is a bottom plan view of the underside of my invention with the bracket and motor omitted.

Figure 6 is a vertical fragmentary section of my device along the line 6—6 of Figure 2.

Figure 7 is a detail of the construction shown in Figure 4 showing details of the ejector mechanism.

Figure 8 is a side view of the detail shown in Figure 7, taken from the right of said figure.

Figure 9 is a section on the line 9—9 of Figure 6.

Figure 10 is a horizontal sectional view along the line 10—10 of Figure 4.

Figure 11 is an enlarged perspective view of the mechanism for advancing the plates or slides.

Figure 12 is a front view of one of the plates or slides.

Figure 13 is a side elevation of one of the plates or slides, as viewed from the right of Figure 12.

Figure 14 is a sectional view of one of the plates or slides along the line 14—14 of Figure 12, and with the picture inserted in the slide.

Figure 15 is a sectional view of one of the plates or slides along the line 15—15 of Figure 12, and showing the picture being inserted into the slide.

My invention is primarily a plate holding and advancing device adapted to be attached to a projector and herein is illustrated in connection with an opaque projector. It is also obvious that my device can be incorporated in a number of existing projectors, as it forms a single unit, easily attached to a projector.

A casing 1, having a removable cover 2, is supported as by legs 3 and is provided with means 4 for clamping it to a projector. The front of my machine is provided with a centrally disposed opening 5, which opening is so positioned with respect to the projecting machine with which my attachment is used that the light from the projecting machine will fall through the opening on to the picture to be projected, and which is positioned therein. Within the casing 1, and located a distance from the bottom, is a shelf or support 6 from which the entire operating mechanism is supported. The length of the shelf 6 is equal to the width of the casing 1 to the sides of which it is secured. The shelf 6 is provided with upwardly extending sides 7 and 8 which form guides against which the lower portions of the plates rest. Corresponding guides 7' and 8' are supported from the top of the device and engage the upper portions of the slides. A motor 9 is supported from the shelf 6 by a bracket 10. A gear box 11 is supported from the shelf 6 by brackets 12. This gear box contains a horizontal shaft 13 to the end of which is secured a pulley 14 driven by belts 15 which in turn are driven by a pulley 16 secured to the shaft of the motor 9. A shaft 17 is journaled in the gear box 11 and is driven by the shaft 13 through suitable gearing, not shown. Secured to the shaft 17 is a sprocket 18. At the opposite end of the shelf 6 is slidably mounted a bracket 19, adjustable by a screw 20 to tension the chain described hereinafter. Journaled in the bracket 19 is a shaft 21 to which a sprocket 22 is secured, the shaft 21 being driven by a chain 23 trained over the sprockets 18 and 22. A cam plate 24 rests on the shelf 6 and in turn supports a frame 25 upon the top of which is secured a second cam 27. The purpose of these cam plates will be explained later.

The casing 1 is provided with two interior partitions 29 and 30 which, together with the frame 25 and the cams 24 and 27, form retaining means or pockets for the stacks of plates 31 and 32, there being two stacks, one on each side of the frame 25. Secured to the partitions 29 and 30 are the guides 7' and 8'. These guides are spaced a sufficient distance from the cams 24 and 27 to permit the plates to slide between the guides and the cam plates. The guides 7' and 8' and the cam 27 tend to support the plates at the top, while the upright guides 7 and 8 on the shelf 6 together with the lower cam 24 tend to hold the plates at the bottom.

Pivoted on the chain 23 by means of a stud 37 is a dog 38. Between the dog 38 and the chain 23 is a roller 39 adapted to bear against the lower part of the shelf 6. The shelf 6 is provided with slots 40 and 41 through which the end 42 of the dog 38 projects for the purpose of moving the slides. Secured to the dog 38 by means of a stud 43 is another roller 44. Two tracks 45 and 46 are secured to the shelf 6 by means of brackets 47 and 48 respectively. The tracks 45 and 46 each has a raised portion 49 and a depressed or cutaway portion 50. Secured to the chain 23 is a stud or pin 51 the purpose of which will be described later.

Secured to the edge of the shelf 6 at the rear and behind the stack of plates 31 are two bearings 52 in which are journaled two vertically disposed rods 53. These rods at their upper ends are also journaled in suitable bearings. Rigidly secured to the rods 53 are four crank members 54 each one carrying a roller 55. A rod 56 pivoted at either end to the lower members 54 carries a squared piece or lug 57 to which an arm 58 is pivoted, this arm also being pivoted at 59 to a suitable support. The arm 58 extends down below the edge of the shelf 6 through a slot 60 therein and into position to be operated by the pin 51.

The rods 53, together with the cranks 54 and the rollers 55, cross rod 56, and the lever 58 form a feeding mechanism for feeding forward the stack of plates 31. A similar feeding mechanism indicated generally at 61 is secured to the shelf 6 at the opposite end and on the opposite side thereof for feeding the corresponding stack of plates 32.

The operation of the device is as follows:

Assuming the dog 38 to be in the position shown in Figure 6, the cover 2 is lifted and a stack of plates is placed in each compartment. An equal number of plates is placed in each stack 31 and 32, and another plate is placed in the position indicated at 62. The motor is then started. The point 42 of the dog 38 will engage the edge of the front plate in the stack 32, since the roller 44 is riding on the raised portion 49 of the track 45, the end 42 projecting through the slot 40 in the shelf 6. This plate will then be moved to the position indicated at 63 in Figure 2, which is the exposure position. The direction of the travel of the chain is in the line of the arrow shown in Figure 6 or counterclockwise as viewed in Figure 2. The pin 51 shown in Figure 5 is traveling in rear of the dog 38 at a distance somewhat more than the width of the two plates. This pin 51 is raised by the cam 51' to a position in which it engages the end of the lever 58 of the advancing mechanism 61, causing the members 54 to assume their position at right angles with the rear of the casing, thus pushing against the stack of plates 32 and forcing the plates forward in the compartment, leaving a space at the rear of the stack 32 and forcing another plate into position over the slot 40. The roller 44 on the dog 38 follows the contour of the track 45. As long as it is riding on the raised portion 49 of the track, the end 42 will engage the front plate of the stack. At the time the roller strikes the depressed portion 50 of the track 45, engagement of the end 42 with the end 40' of the slot 40 will cause the dog to turn, thus becoming disengaged from the plate. The dog by the movement of the chain will then be carried around to the opposite side of the machine where the roller 44 will engage the raised portion 49 of the corresponding track 46. Since the condition of the device now is such that the stack 31 has one more plate than the stack 32, the end 42 of the dog 38 will engage the rear plate of the stack 31 moving it to the position of the plate 62 and forcing plate 62 into the vacant space in the rear of the stack 32. As it enters this space, the plate 62 will hit the rollers 55 of the advancing mechanism 61 and force them sideways to permit the entrance of the plate 62. This will leave the machine in a position so that the stack 31 will have one less plate than the stack 32. In the meantime, the pin 51 has traveled to a position to engage the end of the lever 58 of the advancing mechanism in front of the stack 31 and tends to move the stack 31 forward, so that the advancing dog can then repeat the operation of removing a plate from the stack 32 and inserting a plate in the stack 31. Thus, every plate is consequently removed from the stack 32 and into projecting position as shown at the position indicated at 63, while the plate just exhibited is removed and placed in the opposite stack 31. In the same way the plates are transferred from one stack to another, so that every plate in its turn is brought into and out of projecting position. This operation may be continued until all the plates have been displayed. If the device is used for advertising purposes, the plates may be shown repeatedly as often as desired.

The edges of the plates or slides are always in contact with the cam plates 24 and 27, and, as the plates are moved forward in the stacks 31 and 32, the cam edges of the cam plates 24 and 27 will force into exact alignment any plate which, by chance, has not been brought into its true position on account of any stretching of the chain of any inaccuracy of adjustment.

In order to provide an easy means for removing the stacks of plates, I have provided a simple and rugged ejector mechanism for quickly and easily raising one or two plates from the stack, so that the remaining plates can be gripped by the fingers and removed. Thereby, space enough is permitted to allow the hand to be inserted to remove the remaining plates. The description of this ejector mechanism is as follows:

Slidably mounted in the cam plates 24 and 27 is a rod 64. This rod 64 passes through a hole in a rib 65 of the frame 25. The rod 64 is provided with a pin 66 between which and the cam plate 24 is a spring 68. This spring 68 tends to keep the rod 64 in a raised position. A lever 69 is pivoted in an opening 70 in the shelf 6 and is normally held in a horizontal position by a flat spring 71. The end 69' of the lever 69 is always in position under the lower edge of two of the plates in the stack 31, while the opposite end of the lever always rests against the end of the rod 64. A similar ejector mechanism having a rod 73 is provided at the other side of the frame 25 and acts as an ejector mechanism for the other stack of plates 32. The operation of the ejector mechanism is as follows:

When it is desired to remove the stack of plates 31, the rod 64 is depressed, thereby raising the end 69' of the lever 69 and lifting two of the plates out of the stack 31, so that the upper edges of the plates may be gripped by the fingers. When the rod 64 is released, the spring 68 returns it to its normal position and the flat spring 71 returns the lever 69 to its horizontal position. The ejected plates having been removed, the other plates may be easily removed with the fingers for which there is now room, and a new stack of plates may be substituted for the old stack. This operation may be repeated on the other side of the machine and the other stack of plates 32 removed in a similar manner.

In order that a large number of pictures or views may be exhibited without the necessity of employing a large number of plates, and in order that the pictures may be used in the machine without becoming injured or defaced, I prefer to employ a peculiar type of plate or holder shown in Figures 12 to 15 inclusive. A plate 74, which may be of aluminum or any other similar material, is shaped so that the ends are formed into ribs or edges 75 which project above the surface of the plate. The ribs 75 are exactly alike with the exception that the end portions 76 and 77 of the upper rib 75 are bent backward to form stops. The purpose of these stops will hereafter be explained.

The plate 74 is provided with sides 78 which may be integral therewith, and which are provided with flanges 79 which are substantially parallel with the plate 74. Two holes 80 are provided in the plate 74. A picture or view 81 is retained in the holder or plate 74 in the manner shown in Figures 12 and 14, that is, the lower edge of the picture fits into the pocket formed by the lower rib 75 and goes underneath a flange 82 of the upper rib and against the stops 76 and 77. At the same time it is retained by the side flanges 79 and the flange 83 of the lower rib 75. In order to remove the picture from the plate, the thumbs are inserted in the holes 80 and the picture 81 is pushed downward shoving the picture further into the pocket of the bottom rib 75, until the upper edge clears the flange 82. The picture may then be forced past the flange 82 of the upper rib 75 into the position shown in Figure 15, whence it is readily removed from engagement with the flanges 79 which, as I have shown, are cut away in the upper portion and do not extend the full length of the plate 74. When the plates are in the stacks 31 and 32, the raised portion of the ribs 75 of the front plate will bear against the front metal portion of the next succeeding plate. The plate 74 being depressed will not come in contact with the picture contained in the next slide or holder. Thus, the picture is protected, and the only rubbing or friction is metal against metal and nothing contacts with the picture which may be of paper or any other suitable material.

My device is an attachment adapted to be secured to a suitable projector by means of the attachments shown at 4 which may be hooks or any other suitable means. It is obvious, however, that, if desired, a single unit could be built which would include my plate feeding mechanism and the projecting apparatus shown in my aforesaid copending applications, or any other suitable projecting apparatus.

It is obvious that many modifications can be made in my device and still bring it within the spirit of my invention.

I claim:

1. A slide-shifting device having a base, means to support a slide on said base in image projecting position, retaining means for a stack of slides on both sides of said position, a chain supported on said base, a dog on said chain adapted to engage a slide in said stacks, and means for moving the chain so that the slides are consecutively shifted into image projecting position.

2. A slide-shifting device comprising a base, means to support a slide on said base in image projecting position, retaining means for a stack of slides on both sides of said position, a chain supported on said base, said chain carrying a lug, and means actuated by said lug for moving the plates forward in the stack.

3. A slide-shifting device comprising a base, means to support a slide on said base in image projecting position, retaining means for a stack of slides on both sides of said position, a chain supported on said base, and means actuated by the chain for positively feeding the slides forward in said stacks.

4. A slide-shifting device comprising a base, a chain supported on said base, means for driving said chain, means to support a slide on said base in image projecting position, retaining means for a stack of slides on either side of said slide, means operative on the movement of said chain to shift the slides consecutively into image projecting position and from one stack to another, means operative on the movement of said chain for advancing the slides in the stacks, and means for aligning the slides in the stacks upon the movement of the slides in the stacks.

5. A slide-shifting device comprising a base upon which a slide is adapted to be supported on its edge, an endless chain supported beneath said base, a dog pivoted on said chain and having one end thereof projecting through a slot in said base to engage a slide, and a track supporting said dog and shaped to hold the dog in engagement with a slide during a predetermined length of travel and then permitting disengagement of the dog from the slide.

6. A slide-shifting device comprising a base upon which a slide is adapted to be supported on its edge, an endless chain supported beneath said base, a dog pivoted on said chain and having one end thereof projecting through a slot in said base to engage a slide, and a track supporting said dog and shaped to hold the dog in engagement with a slide during a predetermined length of travel and then permitting disengagement of the dog from the slide, the end of said slide engaging said dog to positively disengage it from said slide.

7. A slide shifting device comprising a base, means to support a slide on said base in image projecting position, retaining means for a stack of slides on both sides of said position, a chain movably mounted on said base and surrounding said stacks, and a dog on said chain adapted in its movement to remove a slide from projecting position into position at the front of one of said stacks and to replace it by a slide from the front of said other stack.

8. A slide shifting device comprising a base, means to support a slide on said base in image projecting position, retaining means for a stack of slides on both sides of said position, a chain movably mounted on said base and surrounding said stacks, a dog on said chain adapted in its movement to remove a slide from projecting position into position at the front of one of said stacks and to replace it by a slide from the front of said other stack, a pin on said chain and advancing mechanism to move the slides in each stack, said mechanism actuated by said pin.

9. A slide shifting device comprising a base, means to support a slide on said base in image projecting position, retaining means for a stack of slides on both sides of said position, a chain movably mounted on said base and surrounding said stacks, a dog on said chain adapted in its movement to remove a slide from projecting position into position at the front of one of said stacks and to replace it by a slide from the front of said other stack, a pin on said chain and advancing mechanism to move the slides in each stack, said mechanism actuated by said pin to advance the slides in a stack and being displaced by a slide entering a stack.

10. A slide shifting device comprising means to support a stack of slides, a chain moving in opposite directions in front and back of said stack, a pin carried by said chain and advancing mechanism for moving the slides lengthwise of the stack, said mechanism being displaced by a slide entering the stack and being actuated by said pin to move said stack.

11. A slide shifting device comprising means to support a stack of slides, a chain moving in opposite directions in front and back of said stack, a pin carried by said chain and advancing mechanism for moving the slides lengthwise of the stack, said advancing means comprising a plurality of cranks, rollers mounted in said cranks and adapted to engage one face of a slide in said stack, means connecting a plurality of said cranks, a lever depending from one of said connecting means and adapted to be engaged by said pin whereby the cranks are operated and the slides in the retaining means advanced.

12. Slide shifting mechanism comprising a base, means to support a slide on said base in image-projecting position, retaining means for a stack of slides on both sides of said position, an endless member, a slide-shifting device on said endless member, means for controlling said device to shift said slide from said position and into one of said stacks, to shift a slide from said one of said stacks to the other stack, and to shift a slide from said other stack into said position, and means for slidably advancing the slides in the respective stacks.

In testimony whereof I have affixed my signature to this specification.

AUSTIN K. HANKS.